United States Patent [19]

Montemurro

[11] 4,444,284
[45] Apr. 24, 1984

[54] CONTROL SYSTEM

[75] Inventor: Thomas O. Montemurro, Lake Delton, Wis.

[73] Assignee: Big Joe Manufacturing Company, Lincolnwood, Ill.

[21] Appl. No.: 290,342

[22] Filed: Aug. 5, 1981

Related U.S. Application Data

[63] Continuation of Ser. No. 40,094, May 18, 1979, abandoned.

[51] Int. Cl.$^3$ ............................................. B62D 51/04
[52] U.S. Cl. .................................... 180/19.1; 200/6 B; 200/153 L; 200/339
[58] Field of Search ..................... 180/19.1, 19.2, 19.3; 318/305; 200/6 B, 153 L, 339

[56] References Cited

U.S. PATENT DOCUMENTS

| 2,401,113 | 5/1946 | Schroeder | 180/19.1 |
| 2,957,536 | 10/1960 | Ulinski | 180/273 |
| 3,168,157 | 2/1965 | Ulinski | 180/19.1 |
| 3,190,994 | 6/1965 | Becker et al. | 180/19.3 |
| 3,300,612 | 1/1967 | Quayle | 180/19.3 |
| 3,477,539 | 11/1969 | De Pung et al. | 180/19.1 |
| 3,557,893 | 1/1971 | Kohls | 180/19.3 |
| 3,657,493 | 4/1972 | Horsley | 280/6 B |

FOREIGN PATENT DOCUMENTS 474095 9/1974 Australia .

*Primary Examiner*—John A. Pekar
*Attorney, Agent, or Firm*—Willian, Brinks, Olds, Hofer, Gilson & Lione Ltd.

[57] ABSTRACT

A control system for an industrial lift truck includes a housing, a cam plate rotatably mounted within said housing, and a plurality of switches urged against and riding on a surface of the cam plate. The cam plate is provided with grooves in its surface along a part of the paths defined by each switch traversing the plate. Accordingly, the movement of the plate actuates switches that are forced into or out of the corresponding groove. The closing and opening of switches produces signals which are used to select the speed and the drive direction of the lift truck.

The cam plate can include detents which accommodate a ball as the cam is rotated to a position where the detent corresponds to the ball. The ball is urged into the detent by a spring. Consequently, the operator is able to select discrete speeds of the lift truck and the rotation of the cam plate is restricted.

The control system can also include additional controllers for controlling other functions of the lift truck. All controllers are preferably close enough to the grip bars of the handle to permit the operator to actuate any of them without removing either hand from the grip bars.

7 Claims, 13 Drawing Figures

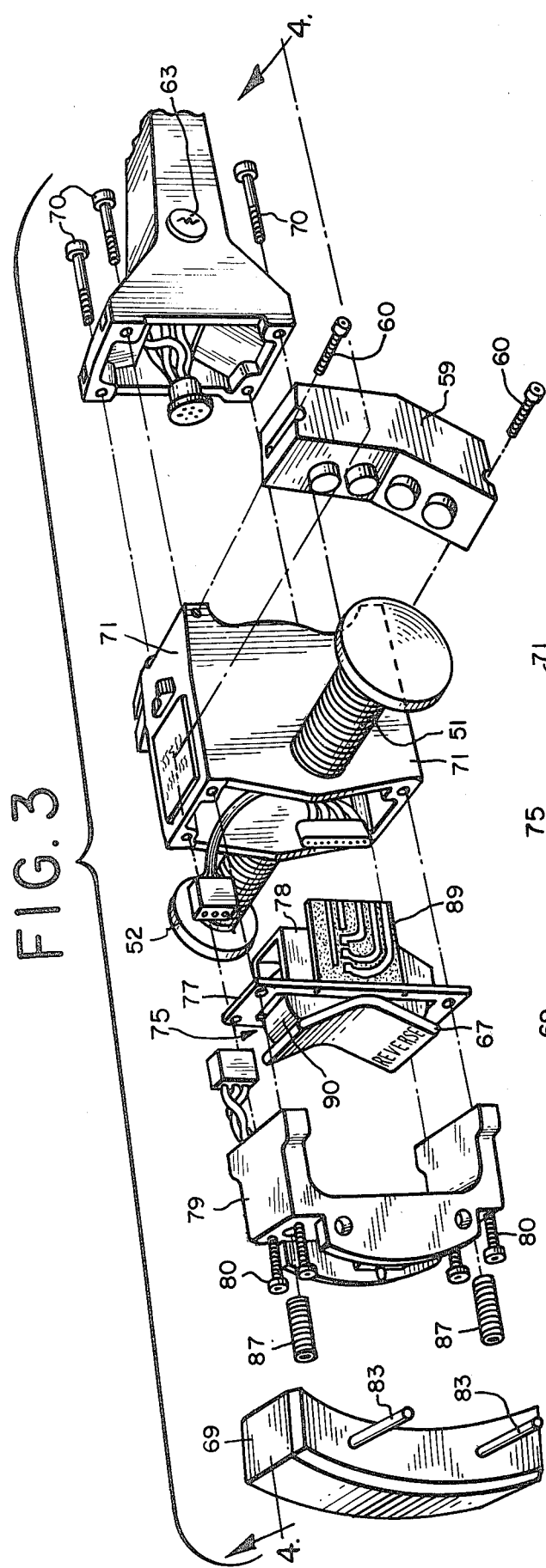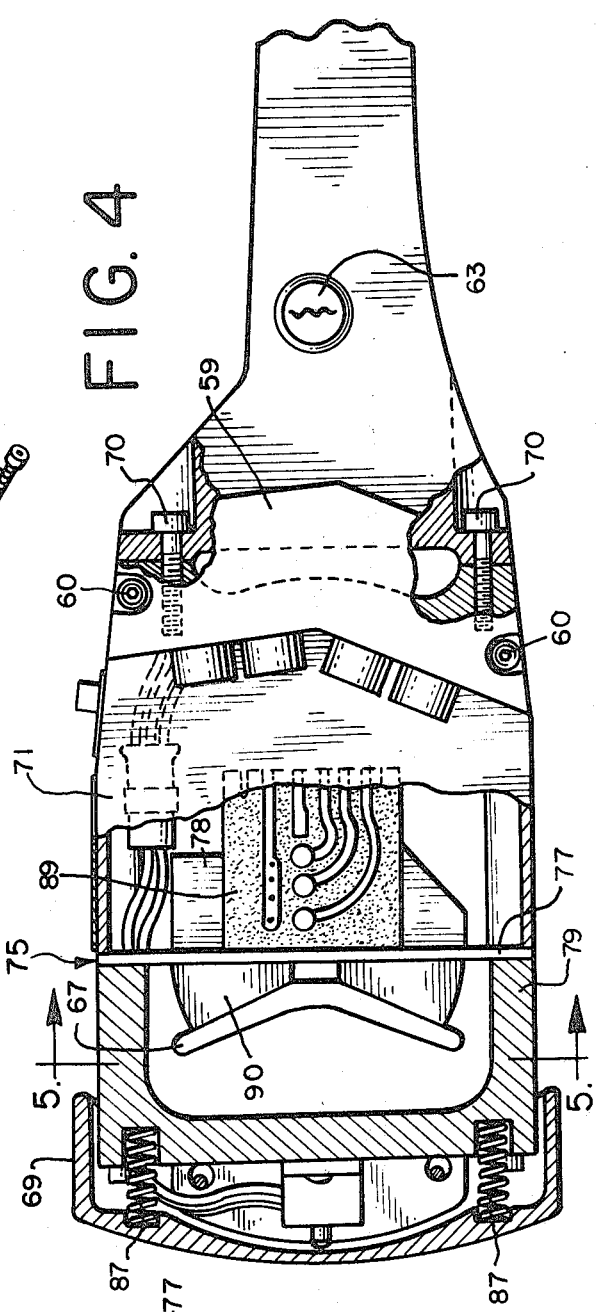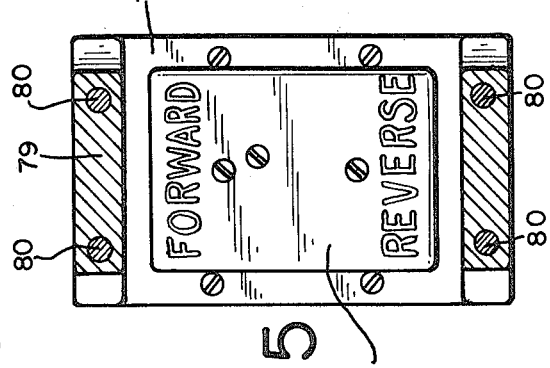

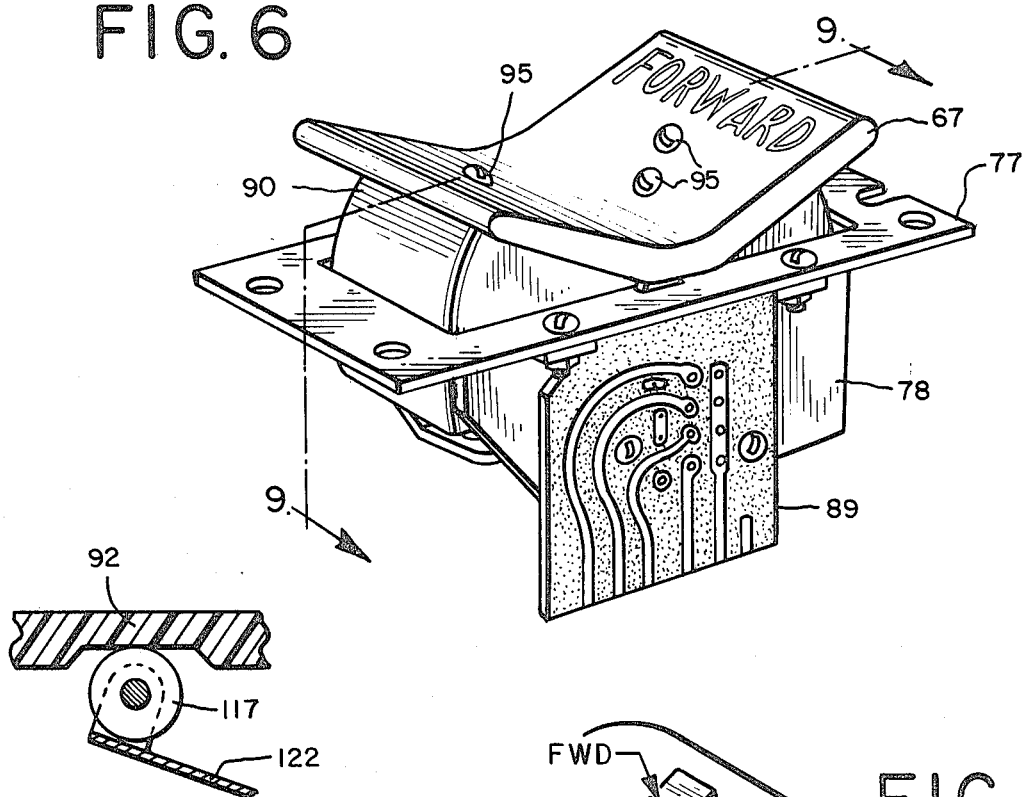
FIG. 6
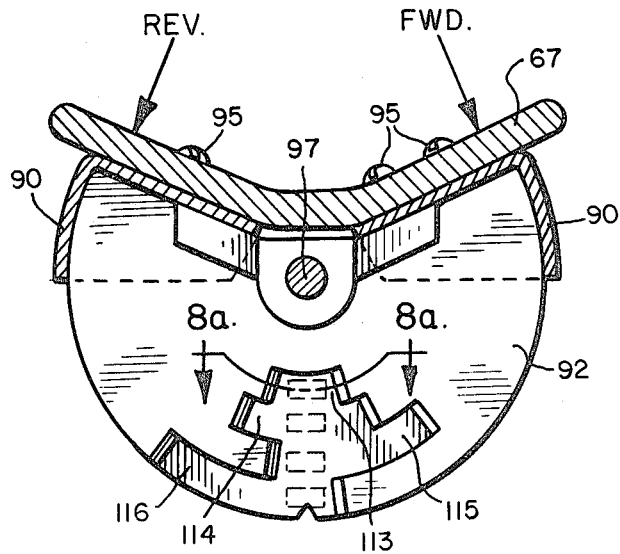
FIG. 8a
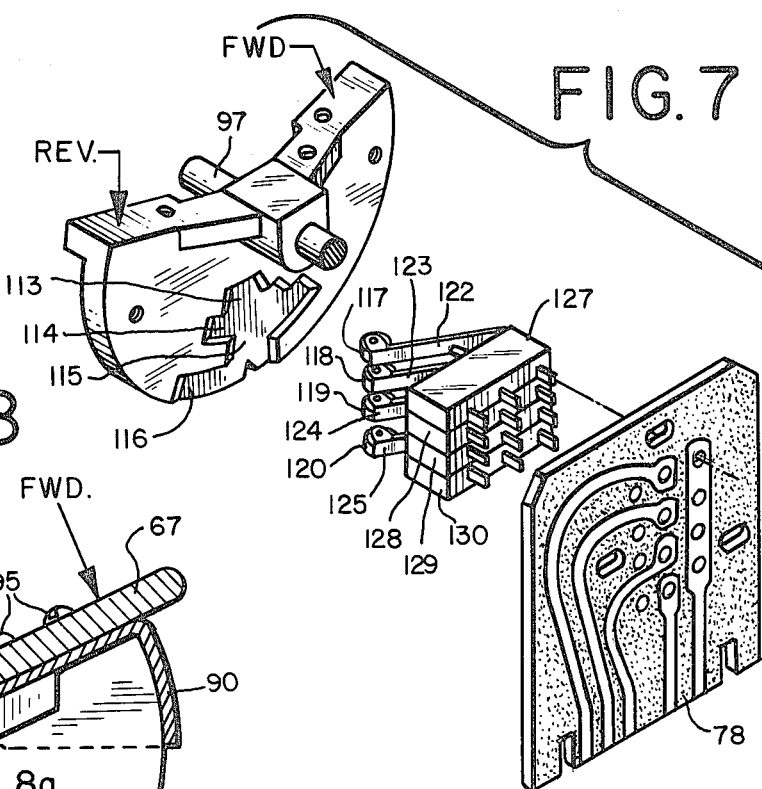
FIG. 7
FIG. 8

CONTROL SYSTEM

This application is a continuation of application Ser. No. 040,094, filed May 18, 1979, now abandoned.

BACKGROUND OF THE INVENTION

This invention relates to control systems for industrial lift trucks. In particular, it relates to control systems for so-called "walkie" industrial lift trucks.

A "walkie" industrial lift truck generally includes a set of controls such as those for lifting and lowering a load, for varying the direction and the speed of the truck and for activating a horn. Since the operator of the lift truck should have an easy access to the controls, the controls should ideally be located on or in the vicinity of the handle used to steer the truck. Various control systems for use in the industrial lift trucks are disclosed in the U.S. Pat. Nos. 3,465,841; 3,724,586; 3,300,612; 2,913,062; 2,957,536; 3,166,139; 3,529,689; 3,168,157; and 3,419,104.

The present invention provides an improved control system useful in industrial lift trucks.

Thus, one object of the present invention is to provide a lift truck control system which is compact and which permits access to all control functions by either or both hands of the operator while the hands are on the grip bars used for steering the truck.

Another object of the invention is to provide a lift truck control system which is easy and inexpensive to manufacture and to install.

A further object of the invention is to provide a control system for controlling the speed and the direction of a lift truck, which has a small number of moving parts and is therefore reliable and not susceptible to wear.

Still another object of the invention is to provide a lift truck controller which employs modular construction.

A still further object of the invention is to provide a controller for controlling the speed and the direction of a lift truck, which permits the selection of discrete predetermined rates of speed.

Other objects of the present invention will become apparent to those skilled in the art upon studying this disclosure.

BRIEF DESCRIPTION OF THE INVENTION

In accordance with one aspect of the invention, there is provided an improved control system for selecting the speed and the direction of an industrial lift truck. The control system includes a movable plate having a plurality of grooves on one surface, a plurality of switching means, and signal transmitting means. In one position of the plate all switching means fit into the corresponding grooves of the plate but as the plate is moved the one or more switching means is forced to leave the corresponding groove causing actuation of that switching means. The signal transmitted to the motor varies depending on which combination of switching means are in the grooves which in turn depends on the location of the plate. Thus, the movement of the plate produces signals which are transmitted to select the speed and the direction of the lift truck.

In accordance with another aspect of the invention there is provided a modular construction control system in which all controls are accessible to either or both hands of the operator while the operator is steering the lift truck. The control system includes a housing and a cam plate rotatably mounted within said housing. The cam plate has on its surface a plurality of grooves. A plurality of switching means are urged against the cam plate and as the cam plate is rotated at least some of the switching means travel along the grooves. When any switching means is forced into the corresponding groove said switching means is actuated. Actuation of each switching means provides a signal to motor means. Thus, the angular position of the plate determines what switch means are actuated and the direction and the speed of the lift truck are determined by actuating various switching means.

In accordance with a further aspect of the invention the control system includes a spring which returns the cam plate to its original position whenever the pressure is not exerted thereon by the operator and said plate has therein a plurality of detents. Urged against the detents by a cantilever spring is a ball which moves into a detent as the cam plate is rotated. Once the ball moves into a detent the force required to maintain the plate in position is reduced. The use of ball-detent feature permits the operator to choose descrete speed increments of the truck.

Other aspects of the invention will become apparent to those skilled in the art upon studying this specification and the appended claims.

BRIEF DESCRIPTION OF THE DRAWINGS

FIG. 3 is an exploded view of a section of the handle shown in FIG. 2 that includes a control system constructed in accordance with this invention.

FIG. 4 is a partial cross-sectional view of the portion of the handle shown in FIG. 3 taken along lines 4—4 thereof.

FIG. 5 is a cross-sectional view of the handle shown in FIG. 4 taken along lines 5—5 thereof.

FIG. 6 is a perspective view of a control mechanism constructed in accordance with the present invention.

FIG. 7 is an exploded view of a portion of the control mechanism constructed in accordance with the present invention, including a cam plate, actuating means and a circuit board.

FIG. 8 is a side-elevational view of the cam plate and actuating means shown in FIG. 7.

FIG. 8a is a partial cross-sectional view of the cam plate and actuating means shown in FIG. 8 and taken along lines 8a—8a thereof.

DETAILED DESCRIPTION OF THE INVENTION

The present invention provides an improved controller and a control system useful in the industrial lift trucks. The invention will be described in connection with a preferred embodiment shown in the figures.

Figure 1:
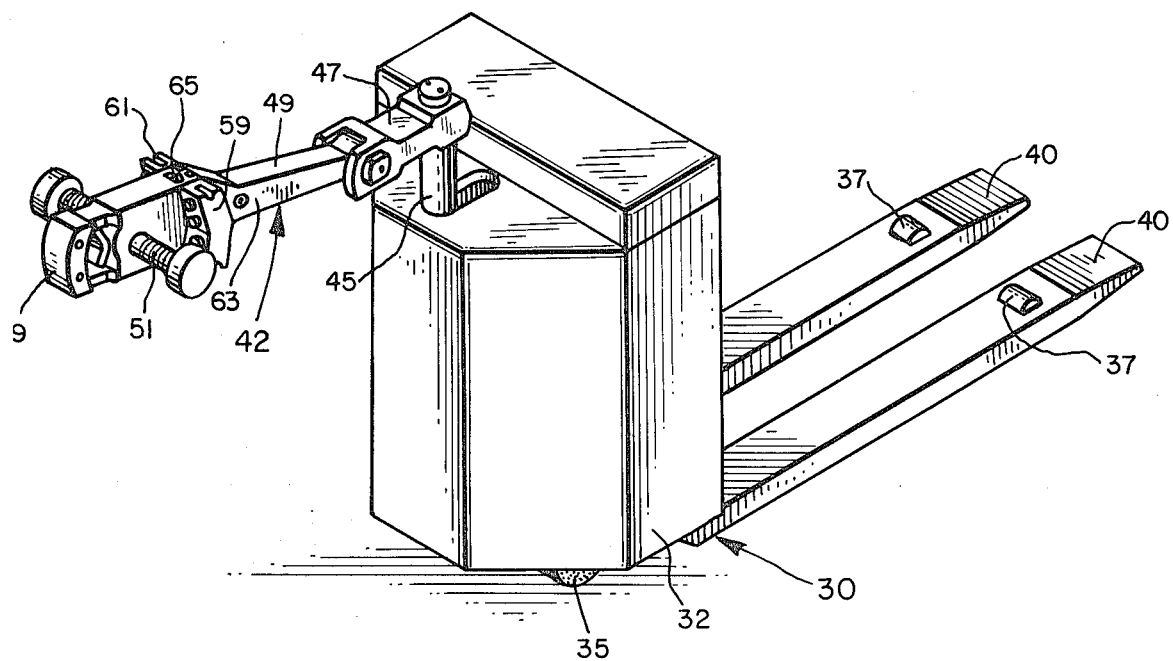
FIG. 1 is a perspective view of an industrial lift truck which includes a control system constructed in accordance with the present invention.
Figure 2:
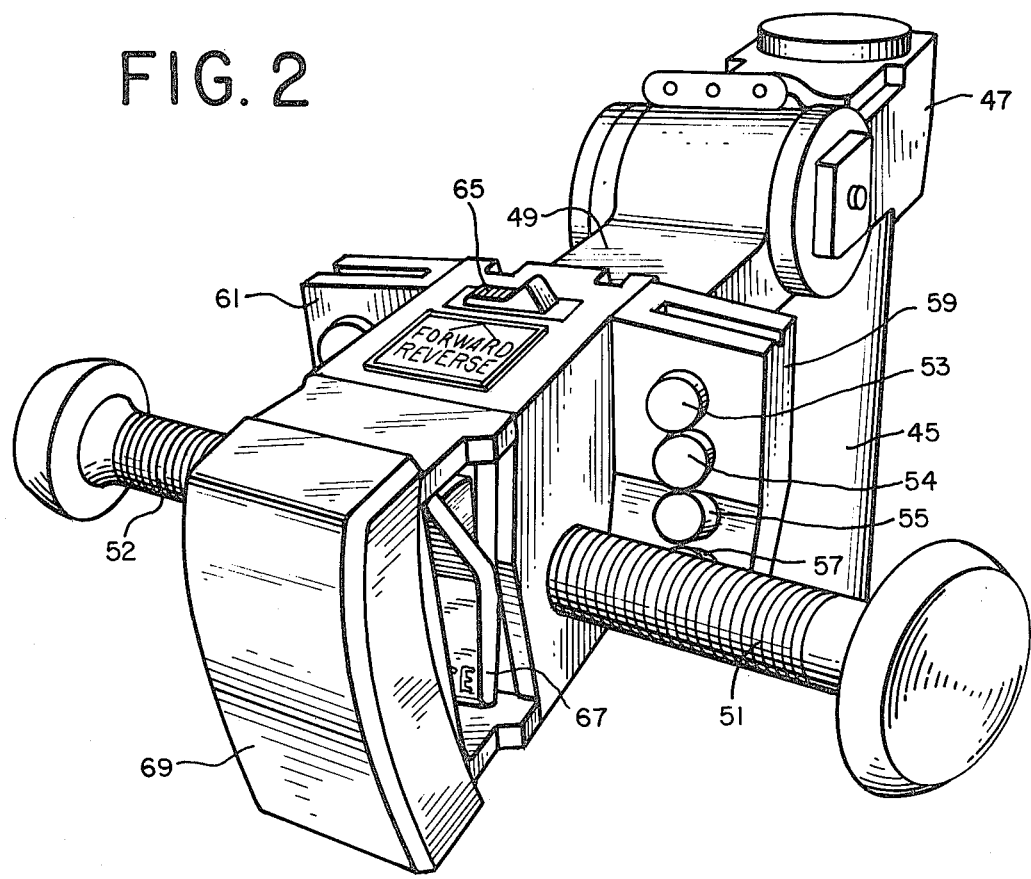
FIG. 2 is a perspective view of a handle of the industrial lift truck shown in FIG. 1, which includes a control system constructed in accordance with the present invention.

Referring now to FIG. 1, an industrial "walkie" lift truck is designated generally by a numeral 30. The lift truck 30 is powered by a motor (not shown) operated by batteries (not shown) located in the power unit 32. The motor is operatively connected to and drives a power wheel 35. The lift truck 30 also includes a pair of load rollers 37 which are rotatably mounted in lift forks 40. The forks 40 are operatively connected to the power unit 32 so that their vertical position can be adjusted as desired. The power wheel 35 is steerable by a control handle 42 which includes a steering shaft 45, a rigidly secured thereto horizontal member 47 and an articulating member 49 pivotally mounted to said horizontal member 47. As shown in FIGS. 1 and 2, grip bars 51 and 52, used by the operator to steer the lift truck 30, are rigidly mounted to the articulating member 49. The control buttons 53, 54, 55 and 57 for activating the horn, the brake, the mechanism for lifting forks 40 and the mechanism for lowering forks 40 are located in the control panel 59 which is rigidly mounted to the articulating member 49 by bolts 60. The control panel 59 is close enough to the grip bar 51 so as to allow the operator to activate any of the control buttons 53, 54, 55 and 57 without removing his hand from the grip bar 51. To enable the operator to actuate the control buttons with a finger of either or both hands, another control panel 61 is rigidly mounted to the articulating member 49. The control panel 61 is identical to the control panel 51 and is close enough to the grip bar 52 to allow the operator to activate any of the control buttons in the panel 61 without removing his hand from the grip bar 52. Accordingly, the operator can reach and activate any of the control buttons using either or both hands, without removing his hands from the grip bars 51 and 52.

As shown in FIGS. 1, 3, and 4 between the control panel 59 and the control panel 61 there is provided in the articulating member 49 a switch 63 which is actuated only by a matching key (not shown). When the matching key is in the switch 63 an on-off switch 65 is operable to provide power to operate the lift truck 30. The forward or reverse direction and the rate of speed in either direction is selected by the operator by depressing an actuating lever 67. The lever 67 is accessible to either or both hands of the operator and it is preferably operated using the thumb so that maneuverability is substantially not impaired even while the operator is simultaneously selecting or changing the speed or the direction of the lift truck 30. The control handle 42 also includes a safety cap 69 which, when depressed, reverses the motion of the lift truck 30.

The overall modular construction of the control unit is depicted in FIGS. 3 and 4. An open-ended housing 71 is mounted to the rest of the articulating member 49 by four bolts 70. The grip bars 51 and 52 are rigidly mounted to the housing 71 on opposite sides thereof. The housing 71 accommodates the wiring of the safety switch 73 and of the control mechanism 75 for selecting the speed and the direction of the lift truck. The mechanism 75 fits partly inside the housing 71 and is secured thereto by a rectangular plate 77. The control mechanism 75 includes a partial enclosure 78 secured to the plate 77. A bridge member 79 is secured to the rectangular plate 77 by four screws 80 which extend through the bridge member 79, the rectangular plate 77 into the wall of housing 71. The safety cap 69 is secured to the bridge member 79 by rods 83. The cap 69 is held in position normally away from a safety switch 73 by a pair of helical springs 87.

As shown in FIG. 6 the control mechanism 75 also includes a circuit board 89 and a jacket 90. The details of construction of the control mechanism 75 are depicted in FIGS. 6-11. The manner in which the actuating lever 67 is mounted to the cam plate 92 by screws 95 is best shown in FIGS. 6 and 8. The cam plate 92 is rotatably mounted to the housing 71 on a rod 97 and it is held in a neutral position by a torsional spring 99 acting on posts 101 and 103. As force is applied onto the cam plate 92 causing it to rotate the spring 99 resists the displacement and when the force is removed the spring 99 rotates the cam plate 92 to the neutral position.

Figure 9:
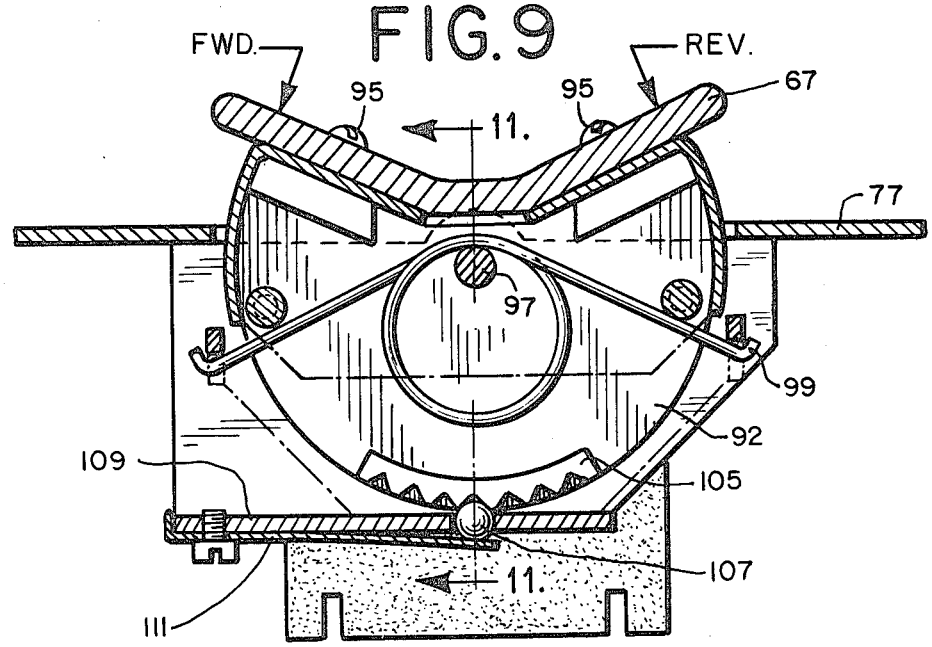
FIG. 9 is a cross-sectional view of the control mechanism of FIG. 6 taken along lines 9—9 thereof.
Figure 10:
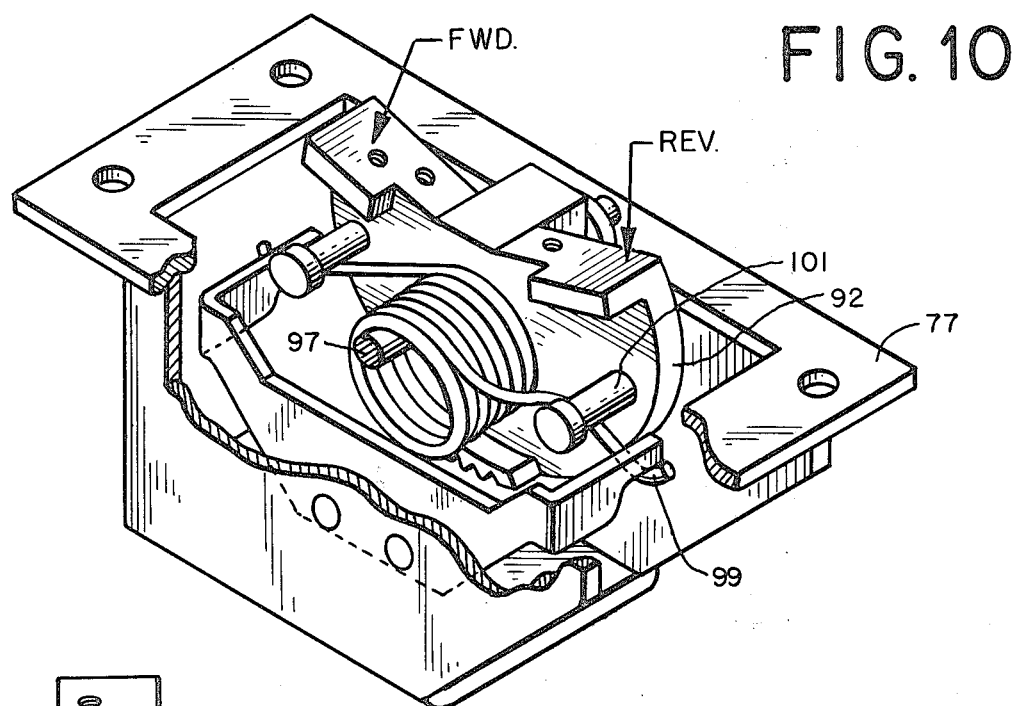
FIG. 10 is a perspective view of the control mechanism constructed in accordance with this invention after removal of an actuating lever.
Figure 11:
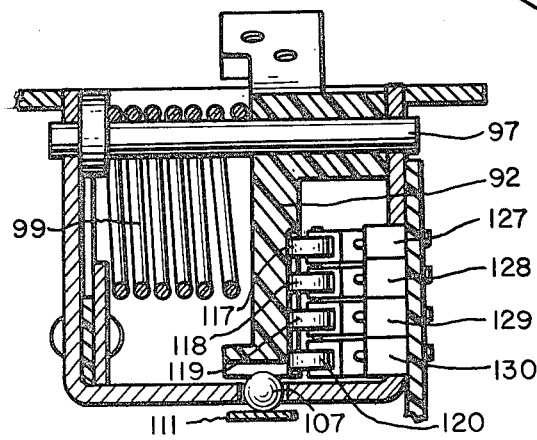
FIG. 11 is a cross-sectional view of the control mechanism of FIG. 9 taken along lines 11—11 thereof.

As shown in FIGS. 9-11, the cam plate 92 also includes a plurality of detents 105 for accommodating a steel ball 107. The ball 107 is positioned in the seat of a plate 109 and biased toward the detents 105 by a cantilever 111. As the cam plate 92 is rotated, the ball 107 moves into the next detent.

Referring now to FIGS. 7 and 8, the cam plate 92 has on one side a plurality of grooves (notches) 113, 114, 115, and 116. Each notch is in the path of a corresponding roller 117, 118, 119, and 120. The rollers are urged against the surface of the cam plate 92 by bias elements 122, 123, 124, and 125. In the neutral position the rollers 117, 118, 119, and 120 fit into grooves 113, 114, 115, and 116, respectively. See, e.g., FIG. 8a. When the cam plate 92 is rotated, however, the rollers leave grooves causing the corresponding micro-switches 127, 128, 129, and 130 to be actuated.

Figure 12:
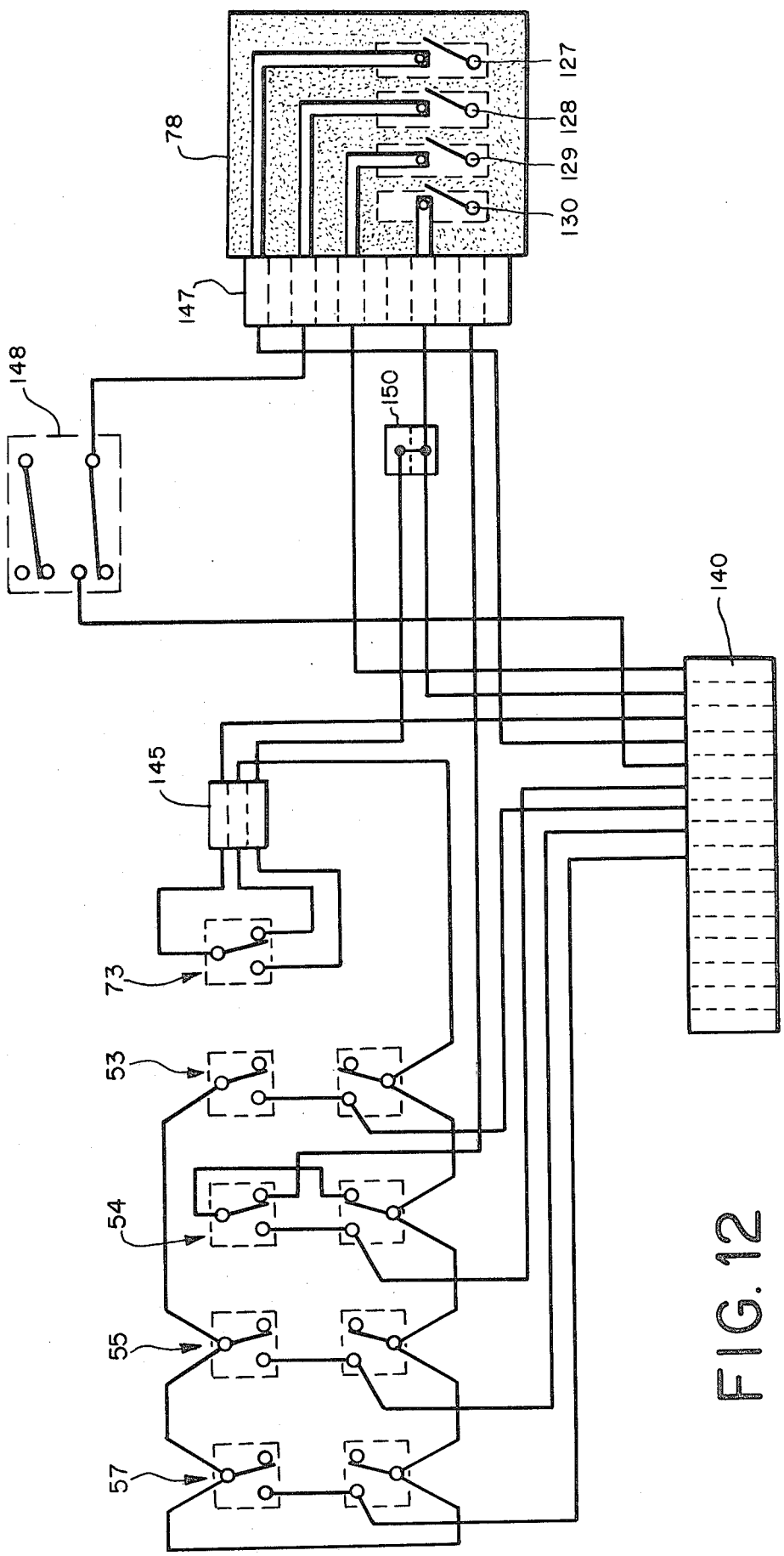
FIG. 12 is a circuit diagram for the control system constructed in accordance with the present invention.

The micro-switches 123, 128, 129, and 130 are positioned in the circuit board 78 as shown in FIGS. 7 and 11. The electrical circuit used in connection with the control system of the preferred embodiment of the present invention is depicted in FIG. 12. The switches of the mechanism 75 are performing the following functions. The switch 130 when actuated transmits to and through the plug connector 140 to the motor an electrical signal causing the lift truck to move forward. The switch 129 when actuated produces an electrical signal reversing the electrical field causing the lift truck to move in the reverse direction. As the cam plate 92 is further rotated in either direction the switch 128 is actuated and a resistance is by-passed (not shown) which causes the truck to operate in the second speed. Further rotation away from the neutral position closes the switch 127 which causes by-passing of another resistance (not shown) causing the truck to operate in the third speed.

Also shown in FIG. 12 are the switches 57, 55, 54, 53 and 73 for lowering forks 40, raising forks 40, activating the break, operating the horn and reversing the motion (safety switch). For completeness it shoud be added that numerals 145 and 147 represent connectors and 148 is a high speed switch. A splice is designated by numeral 150. The manner in which the electrical signals are used to select speeds and direction of the D.C. motor are conventional and well known in the art. In the preferred embodiment to control the speed of the D.C. motor resistances are removed from the circuit and to reverse the direction the electrical field is reversed.

Many changes and modifications will occur to those skilled in the art upon studying this disclosure. For example, the system can be modified to include projections rather than grooves on the cam plate 92. All changes and modifications that fall within the spirit of the present invention are intended to be included within its scope as defined by the appended claims.

I claim:

1. A control handle for an industrial lift truck, said truck including a horn, a brake, forks, a mechanism for lifting said forks and a mechanism for lowering said forks, said control handle comprising:

a housing having a first side and a second side;

a first and a second horizontal grip bar secured to said first and said second sides, respectively;

a first and a second control panels secured to said first and said second sides, respectively;

a plurality of control buttons mounted in said first control panel and a plurality of control buttons mounted in said second panel, said control buttons being for activating the horn, the brake, the mechanism for lifting forks and the mechanism for lowering the forks, said buttons being positioned so as to be reachable by operator's fingers when his hands are on said first and said second horizontal grip bars;

a cam plate having a plate surface and a side surface, said plate being rotatably mounted in said housing for rotation about an axis normal to said plate surface, said plate surface having a plurality of arcuate, contiguous grooves formed therein, said grooves being concentric about an axis;

an actuating lever plate connected to and substantially perpendicular to said cam plate, said actuating lever plate extending above said housing and positioned between said grip bars so as to be reachable and operable by the operator's thumb;

a plurality of switches, each switch having a contact surface urged against and riding on said plate surface such that each of the contact surfaces traverses a respective arcuate path on said plate surface, said arcuate paths being concentric about said axis, each of said grooves being along the path of the respective contact surface, each of said switches being actuated upon entering and leaving its groove to produce electrical signals for selecting the speed and the drive direction of said lift truck;

a spring mounted on said housing and said cam plate for returning said cam plate to its neutral position;

a plurality of detents on said cam plate;

means for engaging one of said detents as the cam is rotated to a discrete position, said engaging means permitting the spring to return said cam plate to its neutral position whenever the cam is not subjected to an external force but sufficiently restricting the rotation of said cam to permit the operator to choose discrete settings of the plate and to reduce the force required to maintain said plate in the selected position, said control handle permitting the operator to actuate desired buttons and to select the speed and the drive direction of the truck while steering said truck.

2. The system of claim 1 wherein said grooves are arcuate and concentric about said axis.

3. The system of claim 2 wherein said grooves are contiguous.

4. The system of claim 3 wherein each said contact surface is the lateral wall of a roller and wherein said contact surface is urged against said plate surface by biasing means.

5. The system of claim 4 wherein said spring is a torsional spring.

6. The system of claim 6 wherein said switches are for mounting in a printed circuit board.

7. A control handle for an industrial lift truck, said truck including a horn, a brake, forks, a mechanism for lifting said forks and a mechanism for lowering said forks, said control handle comprising:

a housing having a first side, a second side and an opening;

a first and a second horizontal grip bar secured to said first and said second sides, respectively;

a first and a second control panels secured to said first and said second sides, respectively;

a plurality of control buttons mounted in said first control panel and a plurality of control buttons mounted in said second panel, said control buttons being for activating the horn, the brake, the mechanism for lifting forks and the mechanism for lowering the forks, said buttons being positioned so as to be reachable by operator's fingers when his hands are on said first and said second horizontal grip bars;

a cam plate having a plate surface and a side surface, said plate being rotatably mounted in said housing for rotation about an axis normal to said plate surface, said surface having a plurality of arcuate, contiguous grooves formed therein, said grooves being concentric about an axis;

an actuating lever plate connected and substantially perpendicular to said cam plate, said actuating lever plate extending above said housing and positioned between said grip bars so as to be reachable and operable by the operator's thumb;

a torsional spring mounted on said housing and said cam plate for biasing said cam plate toward its neutral position;

a plurality of detents along said side surface, said side surface being substantially perpendicular to said plate surface;

a cantilever spring;

a ball positioned in the opening of said housing such that said cantilever spring urges said ball against one of said detents to restrict the rotation of said cam plate, said torsional spring overcoming said cantilever spring and returning said cam plate to its neutral position whenever no external force is applied to said cam plate;

a plurality of switches mounted on said housing adjacent said cam plate, each switch comprising a roller and a biasing element for biasing said roller against said plate surface such that each of said rollers traverses a respective arcuate path on said plate surface, said arcuate path being concentric about said axis, each of said switches being actuated upon entering and leaving its respective groove to produce electrical signals for selecting the speed and the drive direction of said lift truck, said control handle permitting the operator to actuate desired buttons and to select the speed and the drive direction of the truck while steering said truck.

* * * * *

UNITED STATES PATENT AND TRADEMARK OFFICE
CERTIFICATE OF CORRECTION

PATENT NO. : 4,444,284
DATED : April 24, 1984
INVENTOR(S) : Thomas O. Montemurro It is certified that error appears in the above-identified patent and that said Letters Patent is hereby corrected as shown below:

Cover page, right hand column, delete commas in name of attorneys

Column 4, line 53, change -- shoud -- to "should"

Column 6, line 5, change -- 6 second occurrence -- to "5"

Column 6, line 50, change -- to -- to "on"

Signed and Sealed this

Third Day of December 1985

[SEAL]

Attest:

DONALD J. QUIGG

*Attesting Officer*  *Commissioner of Patents and Trademarks*